United States Patent
Zilliacus et al.

(10) Patent No.: US 8,023,953 B2
(45) Date of Patent: *Sep. 20, 2011

(54) MAPPING WIRELESS PROXIMITY IDENTIFICATOR TO SUBSCRIBER IDENTITY FOR HOTSPOT BASED WIRELESS SERVICES FOR MOBILE TERMINALS

(75) Inventors: Martin Zilliacus, Espoo (FI); Ari Koli, Helsinki (FI)

(73) Assignee: Intellectual Ventures I LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/732,930

(22) Filed: Mar. 26, 2010

(65) Prior Publication Data

US 2010/0184377 A1    Jul. 22, 2010

Related U.S. Application Data

(63) Continuation of application No. 10/694,879, filed on Oct. 29, 2003, now Pat. No. 7,734,293.

(51) Int. Cl.
*H04W 4/00* (2009.01)
(52) U.S. Cl. .......... 455/445; 455/41.2; 455/422.1; 455/436; 455/448; 455/552.1; 370/328; 370/331; 370/470
(58) Field of Classification Search .......... 370/328, 370/331, 466, 467, 470; 455/41.1, 414.1, 455/422.1, 436–445, 552.1, 553.1
See application file for complete search history.

(56) References Cited

U.S. PATENT DOCUMENTS

| 6,138,159 | A | 10/2000 | Phaal |
| 6,243,581 | B1 | 6/2001 | Jawanda |
| 6,285,879 | B1 | 9/2001 | Lechner et al. |
| 6,330,448 | B1 | 12/2001 | Otsuka et al. |
| 6,370,380 | B1 * | 4/2002 | Norefors et al. ............ 455/436 |
| 6,400,722 | B1 | 6/2002 | Chuah et al. |
| 6,430,395 | B2 | 8/2002 | Arazi et al. |
| 6,430,413 | B1 | 8/2002 | Wedi et al. |
| 6,445,921 | B1 | 9/2002 | Bell |
| 6,477,373 | B1 | 11/2002 | Rappaport et al. |

(Continued)

FOREIGN PATENT DOCUMENTS

AU    200135071 A    10/2001

(Continued)

OTHER PUBLICATIONS

EP Search Report dated Feb. 20, 2006.

*Primary Examiner* — Charles Appiah
*Assistant Examiner* — Jaime M Holliday (57) ABSTRACT

A hotspot access point enables a mobile wireless device to resume a service with a network server when service is interrupted by the mobile device moving out of the coverage area of the access point. A short-range communication link is established by the access point with the mobile device based on a local identification of the device. The access point requests additional information from the wireless device. The additional information relates to a wide area network identification of the device. The mobile device transmits additional information to the access point which stores the local area identification and additional identification. The access point transmits to the mobile device a coded identificator of the wireless device based upon the local area identification and a network identification of the device. The access point determines whether service with the mobile device is open and establishes a wide area connection with the mobile device.

16 Claims, 6 Drawing Sheets

U.S. PATENT DOCUMENTS

| | | |
|---|---|---|
| 6,519,453 B1 | 2/2003 | Hamada et al. |
| 6,580,914 B1 | 6/2003 | Smith |
| 6,728,232 B2 | 4/2004 | Hasty, Jr. et al. |
| 2002/0154627 A1 | 10/2002 | Abrol et al. |
| 2003/0046184 A1 | 3/2003 | Bjorklund et al. |
| 2003/0112789 A1 * | 6/2003 | Heinonen et al. ............ 370/349 |
| 2004/0111699 A1 | 6/2004 | Rockwell |
| 2004/0127204 A1 | 7/2004 | Belmont |
| 2004/0151186 A1 | 8/2004 | Akama |

FOREIGN PATENT DOCUMENTS

| | | |
|---|---|---|
| EP | 1418713 A1 | 5/2004 |
| WO | WO-02/03636 A1 | 1/2002 |
| WO | WO-02/076041 A2 | 9/2002 |
| WO | WO-03/015356 A1 | 2/2003 |

* cited by examiner

FIG. 2A  Bluetooth packet structure for an inquiry packet sent by HS Device to User's Device 100

FIG. 2B  Bluetooth FHS packet structure for an inquiry response packet sent by User's Device 100

MAPPING WIRELESS PROXIMITY IDENTIFICATOR TO SUBSCRIBER IDENTITY FOR HOTSPOT BASED WIRELESS SERVICES FOR MOBILE TERMINALS

CROSS-REFERENCE TO RELATED APPLICATION

This is a continuation application of U.S. patent application Ser. No. 10/694,879 filed Oct. 29, 2003 entitled MAPPING WIRELESS PROXIMITY IDENTIFICATOR TO SUBSCRIBER ENTITY FOR HOTSPOT BASED WIRELESS SERVICES FOR MOBILE TERMINALS, which is hereby incorporated in its entirety by reference.

BACKGROUND OF THE INVENTION

1. Field of Invention

This invention relates to mobile communications devices, methods, and systems. More particularly, the invention relates to mapping wireless proximity identificator to subscriber identity for hotspot based wireless services for mobile terminals.

2. Description of Prior Art

"Hotspot" based wireless services relate to adhoc networks using short-range wireless systems, typically Bluetooth, and provide proximity based wireless services to mobile terminals at "hotspots" or public spaces where people crowd together—airport terminals, shopping malls, sporting events and the like. The hotspot services can be related to any type of service associated with the hotspot, e.g. Internet connection; airline reservations, shopping, real time ticket purchase for sporting events and amusement park admission, billing services for wireless communication within the coverage area, and the like. A hotspot can be tailored to and dedicated to one service only or provide a range of related services, e.g. airline, train and bus schedules at different terminals; hotel, motels, residences and the like. The services are provided in a coverage area via a hotspot access point or hotspot server which at the front end uses 802.11 or WLAN technology and at the back end provides a high speed wired or wireless connection to the Internet. Presently, short-range wireless systems allow a mobile wireless terminal coupled to an access point to resume an Internet contact with a service provider after the contact has been interrupted by the mobile device moving out of the coverage area of the access point. See Ser. No. 09/985,193, filed Nov. 1, 2001, assigned to the same assignee of the present invention and fully incorporated herein.

Hotspot wireless systems, however, do not provide service providers with the ability to contact a mobile device after moving out of the coverage area of the access point serving the service provider. Further, hotspot wireless system are not able to recognize a mobile device having received past services upon entering the coverage area or continue consumer relations with the mobile device after leaving the coverage area. Moreover, many hotspot services are not browser/Java 2 Micro Edition (J2ME) based and rely upon Short Messaging Service (SMS)/Multimedia Messaging Service (MMS) An advantage of SMS/MMS messaging is Global System Mobile (GSM) based terminals do not require any type of additional client functionality since SMS/MMS messaging is a standard feature in such terminals.

It would be desirable in hotspot wireless systems to provide a wireless identificator for a terminal to allow a service provider to maintain an established service session with a mobile device when the mobile device leaves the coverage of the access point. It would be further desirable to enable a hotspot to map the wireless identificator to subscriber or user identity for terminal recognition. It would be still further desirable to allow the service provider to provide alternative communication links with the mobile device when the short-range link is opened. It would be still further desirable to incorporate a service provider in an access point with the option of selecting alternative communication links, both short-range and cellular, to maintain communication sessions with the mobile device when the mobile device leaves the coverage area or continue consumer relations with the terminal at later dates when special services are available from the service provider. The incorporation of the service provider into the access point as a stand-alone-terminal would lower hardware costs through integrated solutions and lower communication costs by direct communication with the user.

Prior art of interest with respect to proximity based services includes:

1) WO 02/076041 A2, published Sep. 26, 2002 discloses a communication system comprising a beacon storing a portion of available data and having access to all of the available data over a first network. The beacon is arranged to communicate with a client terminal over a second network to supply data from the stored portion of available data. The client terminal has access to all of the available data over a third network. Upon a request by a client for data of the available data not within the stored portion, a network is selected from the first network and the third network in dependence on one or more predetermined criteria, the requested data being accessed over the selected network.

2) U.S. Pat. No. 6,400,722 issued Jun. 4, 2002 discloses a wireless data network includes a wireless packet switched data network for end users that divides mobility management into local, micro, macro and global connection handover categories and minimizes handoff updates according to the handover category. The network integrates MAC handoff messages with network handoff messages. The network separately directs registration functions to a registration server and direct routing functions to inter-working function units. The network provides an intermediate XTunnel channel between a wireless hub (also called access hub AH) and an inter-working function unit (IWF unit) in a foreign network, and it provides an IXTunnel channel between an inter-working function unit in a foreign network and an inter-working function unit in a home network. The network enhances the layer two tunneling protocol (L2TP) to support a mobile end system, and it performs network layer registration before the start of a PPP communication session.

3) U.S. Pat. No. 6,580,914 issued Jun. 17, 2003 discloses a method and apparatus provide location based filtering for searching for information in response to a request from a mobile handset. The handset detects location information from the mobile network with which the handset is in communication and forwards the location information as part of an information request to an information database. The location information is used as a filter for selecting a response to the information request.

None of the prior art discloses or suggests a hotspot access point (a) enabling a service provider to maintain an established service session with a mobile terminals that leaves the physical coverage of the access point; (b) continuing consumer relations with a terminal after departure from the coverage area or at later times for special services of interest to a user; (c) communicating with the terminal via SMS/MMS messaging; (d) selecting optional communication links to maintain a communication session between a mobile device and a service provider when the terminal leaves the hotspot coverage area, and (e) incorporating a service provider in an access point to select a communication link in establishing a communication session with a mobile device while lowering hardware costs and communication costs.

SUMMARY OF INVENTION

A service provider is coupled to a mobile device via the Internet and a hotspot access point (HAP) using a short-range communication link to the terminal. The access point maintains an established communication session between the mobile device and the service provider when the mobile device leaves the coverage area of the access point. Prior to the establishment of the session, a HAP scans the hotspot environment to discover a mobile terminal. In one embodiment the HAP is a Bluetooth access point using the Service Discovery Protocol (SDP). After discovery of a mobile terminal, the HAP identifies the MAC address of the terminal and sends a message requesting the terminal user provide additional information relating to a wide area network identification of the terminal. and to forward a number (a short number or Global System Mobile (GSM) number) or an email message as a Service Management System (SMS) or Multi Media System (MMS) message. The HAP responds to the number message with instructions to the terminal of how to proceed in establishing a session. The HAP message contains a hashed code of the device hardware address (MAC address) and the Mobile Station Integrated Services Digital Network (MSISDN) number which is used as an identificator for the terminal in wide area communication. The two identifications (MAC/MSISDN) are tied together in the HAP enabling a network server to know the terminal number and also the history of previous accesses to the service provider. When the device leaves the coverage area of the HAP, the provider can maintain the session through the cellular link. The HAP can operate alone or it can operate with a backend service provider. The service provider may be incorporated into the HAP lowering hardware and communication costs. If there is a need to contact a specific mobile device, the HAP can decide to contact the terminal through the short-range link if within the coverage of the access point or via the GSM if outside the access point coverage area.

An aspect of the invention is a hotspot access point enabling a service provider to maintain a session with a mobile device when the mobile device leaves the coverage area of the access point.

Another aspect is hotspot access point registering a mobile device when establishing a communication session with the terminal and enabling a service provider to maintain a session with the terminal when the terminal leaves the coverage area of the access point.

Another aspect is a hotspot access point provider requesting an additional identification from a mobile device in initiating a short-range connection with the mobile terminal.

Another aspect is a mobile device forwarding a Mobile System Integrated System Digital Network (MSISDN) number or cellular network address in response to an inquiry from a hotspot access point for additional information in establishing a communication session with a provider Another aspect is a hotspot access point sending a hashed code to a mobile device wherein the hashed code is based upon the terminal MAC address coupled to the terminal MSISDN number and used as an identificator for the terminal in short-range or cellular communications.

Another aspect is a service provider suggesting to a mobile device to initiate a wide area service session for services not available from the provider, if registration has been previously performed.

Another aspect is a hotspot access point incorporating a service provider for establishing a session with a mobile device via short-range link when the terminal is within the coverage area of an access point or via cellular connection if the terminal is outside the coverage area of the access point.

Another aspect is a hotspot access point incorporating a service provider and providing a range of services available from the service provider.

Another aspect is a hotspot access point incorporating a service provider and communicating with mobile terminals via SMS/MMS messages in supplying services.

Another aspect is a hotspot access point incorporating a service provider maintaining consumer relations with a mobile device after departure from the access point coverage area.

DESCRIPTION OF THE DRAWINGS

The invention will be further understood from a detailed description of a preferred embodiment, taken in conjunction with an appended drawing, in which.

DESCRIPTION OF PREFERRED EMBODIMENT

A brief description of short-range wireless system for hotspot access points will aid in a better understanding of the invention, as follows:

A. Short-Range Wireless Systems

Short-range wireless systems have a typical range of one hundred meters or less. They often combine with systems wired to the Internet to provide communication over long distances. The category of short-range wireless systems includes wireless personal area networks (PANs) and wireless local area networks (LANs). They have the common feature of operating in unlicensed portions of the radio spectrum, usually either in the 2.4 GHz Industrial, Scientific, and Medical (ISM) band or the 5 GHz Unlicensed-National Information Infrastructure (U-NII) band. Wireless personal area networks use low cost, low power wireless devices that have a typical range of ten meters. The best-known example of wireless personal area network technology is the Bluetooth Standard, which operates in the 2.4 GHz ISM band. It provides a peak air link speed of one Mbps and a power consumption low enough for use in personal, portable electronics such as PDAs and mobile phones. Wireless local area networks generally operate at higher peak speeds of between 10 to 100 Mbps and have a longer range, which requires greater power consumption. Wireless local area networks are typically used as wireless links from portable laptop computers to a wired LAN, via an access point (AP). Examples of wireless local area network technology include the IEEE 802.11 Wireless LAN Standard and the HiperLAN Standard, which operates in the 5 GHz U-NII band.

B. Bluetooth Short-Range Wireless Technology

Bluetooth is a short-range radio network, originally intended as a cable replacement. It can be used to create networks of up to eight devices operating together. The Bluetooth Special Interest Group, Specification Of The Bluetooth System, Volumes 1 and 2, Core and Profiles: Version 1.1, 22 Feb., 2001, describes the principles of Bluetooth device operation and communication protocols. The devices operate in the 2.4 GHz radio band reserved for general use by Industrial, Scientific, and Medical (ISM) applications. Bluetooth devices are designed to find other Bluetooth devices within their ten meter radio communications range and to discover what services they offer, using a service discovery protocol (SDP).

The SDP searching function relies on links being established between the requesting Bluetooth device, such as a stationary access point device, and the responding Bluetooth device, such as a mobile user's device. When the mobile user's device enters within communicating range of the access point, its Link Controller layer in its transport protocol group handles the exchange of inquiry and paging packets to establish the initial link with the access point device. This process is relatively fast, typically being completed in approximately from one to five seconds. Then, the Logical Link Control and Adaptation Protocol (L2CAP) layer in the transport protocol group passes the link status up to the layers in a middleware protocol group. The SDP searching function in the middleware protocol group can then be used to find out about application programs in the responding Bluetooth device that may provide desired services. The SDP searching function can require several seconds to complete, depending on the complexity of the search and the size of the device's registry.

An example application program service that can be discovered by the SDP searching function is the Wireless Application Environment (WAE) graphical user interface (GUI) function of the Wireless Application Protocol (WAP). WAP-enabled wireless devices can use a microbrowser to display content on a small screen of the device. WAP uses a combination of Internet protocols with other protocols especially modified to work with mobile terminals. The Internet protocols are: Point to Point Protocol (PPP), Internet Protocol (IP), and User Datagram Protocol (UDP). The special mobile device protocols are: Wireless Transport Layer Security (WTLS), Wireless Transaction Protocol (WTP), Wireless Session Protocol (WSP), and Wireless Application Environment (WAE). It is the WAE that provides the microbrowser user interface for WAP. In order to establish a connection to send content from the requesting access point device to the WAE microbrowser of the responding user's device, each of the WAP protocol layers WTLS, WTP, WSP, and WAE must be established, which can require several more seconds to complete and possibly significant user interaction on the way.

C. The IEEE 802.11 Wireless LAN Standard

The IEEE 802.11 Wireless LAN Standard defines at least two different physical (PHY) specifications and one common medium access control (MAC) specification. The WEE 802.11(a) Standard is designed for either the 2.4 GHz ISM band or the 5 GHz U-NII band, and uses orthogonal frequency division multiplexing (OFDM) to deliver up to 54 Mbps data rates. The IEEE 802.11(b) Standard is designed for the 2.4 GHz ISM band and uses direct sequence spread spectrum (DSSS) to deliver up to 11 Mbps data rates. The IEEE 802.11 Wireless LAN Standard describes two major components, the mobile station and the fixed access point (AP). IEEE 802.11 networks can be configured where the mobile stations communicate with a fixed access point. IEEE 802.11 also supports distributed activities similar those of the Bluetooth piconets. The IEEE 802.11 standard provides wireless devices with service inquiry features similar to the Bluetooth inquiry and scanning features.

In order for an IEEE 802.11 mobile station to communicate with other stations in a network, it must first find the stations. The process of finding another station is by inquiring. Active inquiry requires the inquiring station to transmit queries and invoke responses from other wireless stations in a network. In an active inquiry, the mobile station will transmit a probe request frame. If there is a network on the same channel that matches the service set identity (SSID) in the probe request frame, a station in that network will respond by sending a probe response frame to the inquiring station. The probe response includes the information necessary for the inquiring station to access a description of the network. The inquiring station will also process any other received probe response and Beacon frames. Once the inquiring station has processed any responses, or has decided there will be no responses, it may change to another channel and repeat the process. At the conclusion of the inquiry, the station has accumulated information about the networks in its vicinity. Once a station has performed an inquiry that results in one or more network descriptions, the station may choose to join one of the networks. The IEEE 802.11 Wireless LAN Standard is published in three parts as *IEEE* 802.11-1999; *IEEE* 802.11a-1999; and *IEEE* 802.11b-1999, which are available from the IEEE, Inc. web site http://grouper.ieee.org/groups/802/11.

In the case of IEEE 802.11 mobile stations, if the user's mobile device has enough speed to travel across the communications area of the IEEE 802.11 access point before completing downloading data from a network server, the contact with the server will be irretrievably lost.

D. High Performance Radio Local Area Network (HiperLAN)

The HiperLAN standard provides a wireless LAN with a high data rate of up to 54 Mbps and a medium-range of 50 meters. HiperLAN wireless LANs provide multimedia distribution with video QoS, reserved spectrum, and good in-building propagation. There are two HiperLAN standards. HiperLAN Type 1 is a dynamic, priority driven channel access protocol similar to wireless Ethernet. HiperLAN Type 2 is reserved channel access protocol similar to a wireless version of ATM. Both HiperLAN Type 1 and HiperLAN Type 2 use dedicated spectrum at 5 GHz. HiperLAN Type 1 uses an advanced channel equalizer to deal with intersymbol interference and signal multipath. HiperLAN Type 2 avoids these interference problems by using OFDM and a frequency transform function. The HiperLAN Type 2 specification offers options for bit rates of 6, 16, 36, and 54 Mbps. The physical layer adopts an OFDM multiple carrier scheme using 48 carrier frequencies per OFDM symbol. Each carrier may then be modulated using BPSK, QPSK, 16-QAM, or 64-QAM to provide different data rates. The modulation schemes chosen for the higher bit rates achieve throughput in the range 30-50 Mbps.

The HiperLAN Type 1 is a dynamic, priority driven channel access protocol that can form networks of wireless devices. HiperLAN Type 1 networks support distributed activities similar those of the Bluetooth piconets and IEEE 802.11 independent basic service sets (IBSS). The HiperLAN Type 1 standard provides wireless devices with service inquiry features similar to those of the Bluetooth inquiry and scanning features and the IEEE 802.11 probe request and response features. An overview of the HiperLAN Type 1 principles of operation is provided in the publication *HiperLAN Type 1 Standard*, ETSI ETS 300 652, WA2 December 1997.

HiperLAN Type 2 is a reserved channel access protocol that forms networks. HiperLAN Type 2 networks support distributed activities similar those of the HiperLAN Type 1 networks, Bluetooth piconets and IEEE 802.11 independent basic service sets (IBSS). HiperLAN Type 2 provides high speed radio communication with typical data rates from 6 MHz to 54 Mbps. It connects portable devices with broadband networks that are based on IP, ATM and other technologies. Centralized mode is used to operate HiperLAN Type 2 as an access network via a fixed access point. A central controller (CC) in the fixed access point provides QoS coordinates the access of the mobile stations support. User mobility is supported within the local service area and wide area roaming mobility can also be supported. An overview of the HiperLAN Type 2 principles of operation is provided in the Broadband Radio Access Networks (BRAN), *HiperLAN Type 2; System Overview*, ETSI TR 101 683 VI.I.1 (2000 February) and a more detailed specification of its ad hoc network architecture is described in *HiperLAN Type 2, Data Link Control (DLC) Layer; Part 4. Extension for Home Environment*, ETSI TS 101 761-4 V1.2.1 (2000 December).

Figure 1:
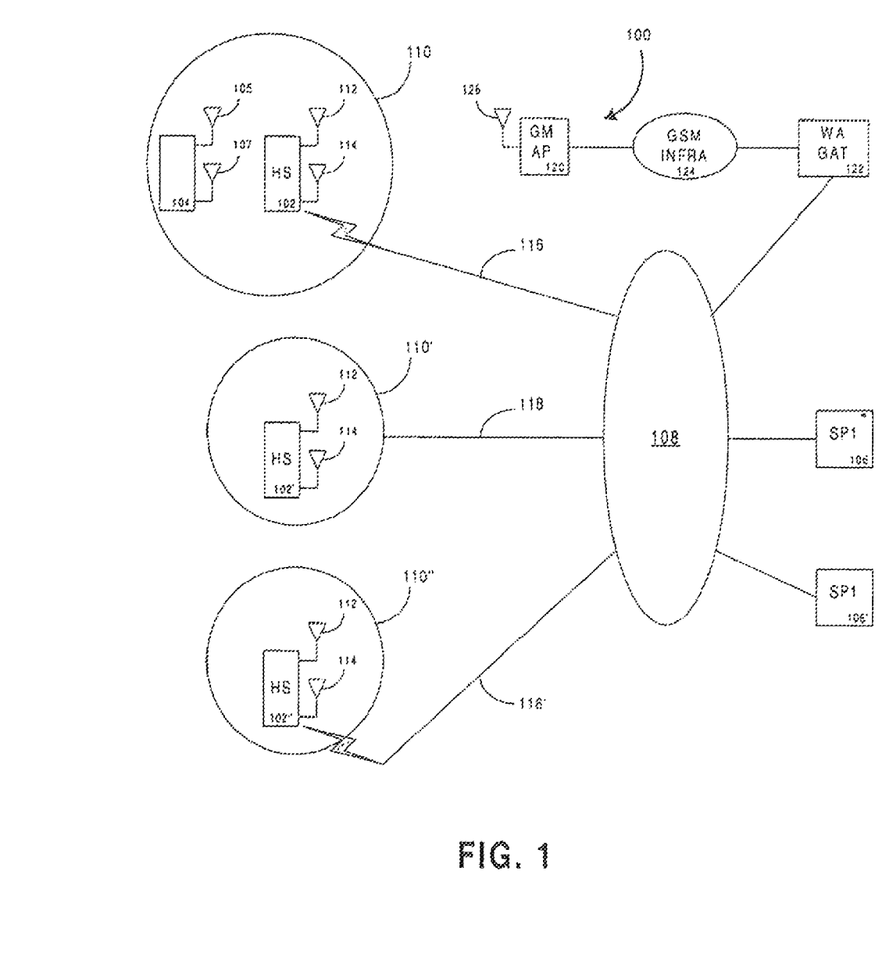
FIG. 1 is a representation of a wireless system including a hotspot access point enabling a service provider interacting with a mobile device via a short-range communication link to maintain a communication session with the terminal when the terminal leaves the coverage area of the access point, and incorporating the principles of the present invention.

FIG. 1 discloses a hotspot wireless system 100, including hotspot access point 102, 102$^1$, 102$^N$ providing mobile device 104 with connections to service providers 106, 106$^1$ via a distributed information network 108 when the terminal 104 is within a coverage area 110, 110$^2$, 110$^N$ served by the access points 102, 102$^2$, 102$^N$, respectively. Hotspot access points are commercially available from several manufacturers including Cisco Corporation, Santa Clara, Calif. The system 100 is adapted to enable the service provider to maintain a communication session with the terminal when the terminal leaves the coverage area of the server 102, continuing consumer relations with the mobile device after departure from the access point coverage, and other functions as will be described hereinafter.

Figure 1A:
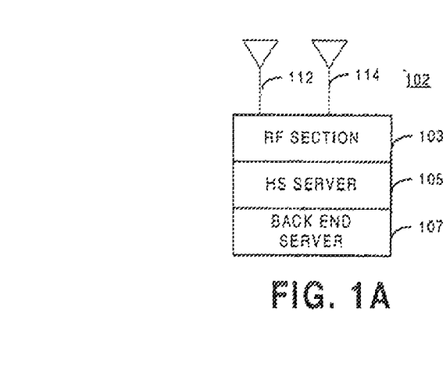
FIG. 1A is a representation of the hotspot access point in FIG. 1

In FIG. 1 the hotspot access point 102, (enlarged in FIG. 1A), includes an RF section 103, a server 105 using 802.11 or WLAN at the front end and a backend server 107 providing a high speed wired or wireless connection to the Internet 108. The server executes a standard operating system (not shown) implementing communication protocols via an antenna 112 for short-range wireless systems, typically Bluetooth and an antenna 114 for cellular networks, typically GSM. The server includes a dedicated application (not shown) for establishing a session with a mobile device and recognizing the MAC address of the mobile device, as will be described in more detail hereinafter. The access point 102 is coupled to the Internet 108, via a wireless link 116 or a wired connection 118.

The Internet is also coupled to a Global System Mobile (GSM) access point 120, via a wireless application program (WAP) gateway 122, and a GSM infrastructure network 124, typically a telephone network. The access point 120 is wirelessly coupled to the hotspot cellular antenna 114, via an antenna 126.

Figure 1B:
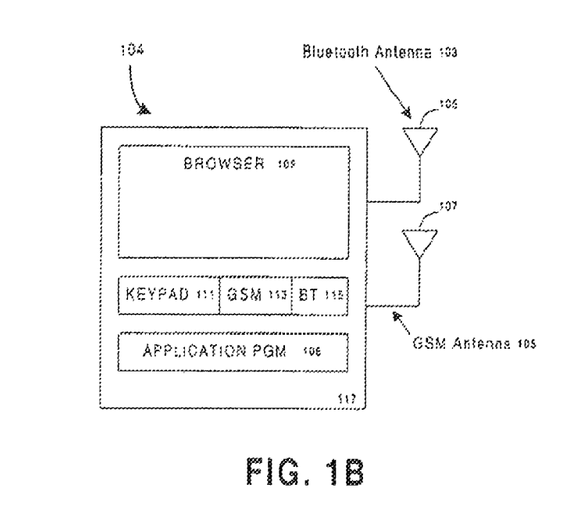
FIG. 1B is a representation of a mobile device in FIG. 1.

FIG. 1B discloses the mobile device 104, including an antenna 105 for short-range communication and an antenna 107 for cellular communication and interacts with the access point using a micro browser. The terminal further includes a keypad 111 and push buttons 113 and 115 for initiating GSM and Bluetooth protocols, respectively. Application programs 117 stored in the terminal include a JAVA 2 platform ((J2ME) utilizing Bluetooth API (JSR82) and a wireless messaging API 120, all available from Sun Micro Systems Co., Mountain View, Calif. Further details on the hardware and software elements of the terminal 104 are described in Ser. No. 08/985, 193, filed Nov. 1, 2001, assigned to the assignee of the present invention and fully incorporated herein.

Figure 2A:
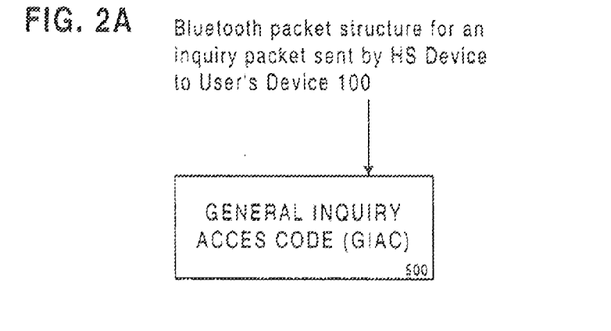
FIG. 2A is a representation of a Bluetooth packet structure of an Inquiry Packet sent to a mobile device by a hotspot access point in establishing a communication session in FIG. 1.
Figure 2B:
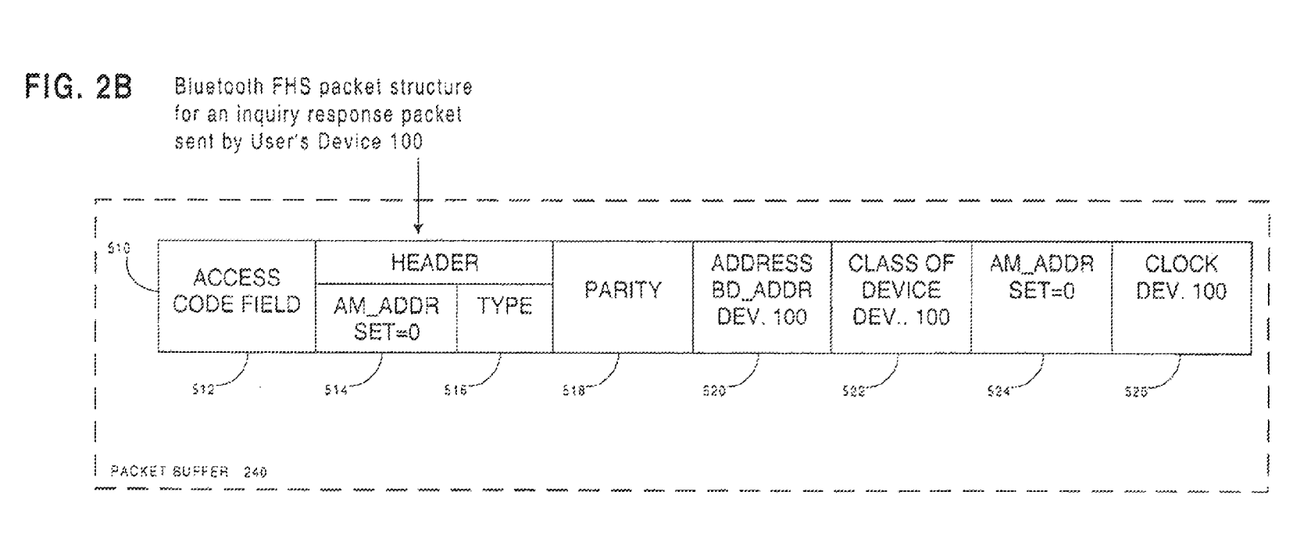
FIG. 2B is a representation of a Bluetooth Frequency Hop Synchronization (FHS) packet sent by the mobile device as a response to the Inquiry Packet of FIG. 2A.

Periodically, the hotspot server sends out Bluetooth inquiry packets 500, via a RF link to a terminal 104 within the coverage area 110. FIG. 2A shows a Bluetooth packet structure for an inquiry packet 500 sent by the server 102 to the terminal 104. A general inquiry access code (GIAC) packet 500 is recognized by all Bluetooth license terminals as an inquiry message. During the inquiry procedure, any other Bluetooth terminal that is in the Inquiry State may respond to the inquiry packet 500. The terminal 104 receives the inquiry packet 500 when in the Inquiry State, and responds with an inquiry response package 510, as shown in FIG. 2B. The packet 510 has sufficient information to enable the hotspot server to build an inquiry response table of the central information required to make a connection. FIG. 2B shows the Bluetooth frequency hop synchronization (FHS) packet structure for an inquiry response packet 510 sent by the terminal 104. The FHS packet structure for a response packet 510 sent by the terminal 104 includes an access code field 512, a header, which includes a slave member number field 514 in which AM_ADDR is not yet assigned and is set to zero; a type field 516 and a parity field 518. Another slave member field 524 also has an AM_ADDR set to zero. Field 522 contains user's class of device (CoD) information. The FHS packet structure for an inquiry response packet 510, provides essential information about the terminal 104 that enables the hotspot access point 102 to make a connection to the terminal 104. Field 520 contains the user's BD_ADDR or MAC address and field 526 contains the user's current clock value.

Figure 2C:
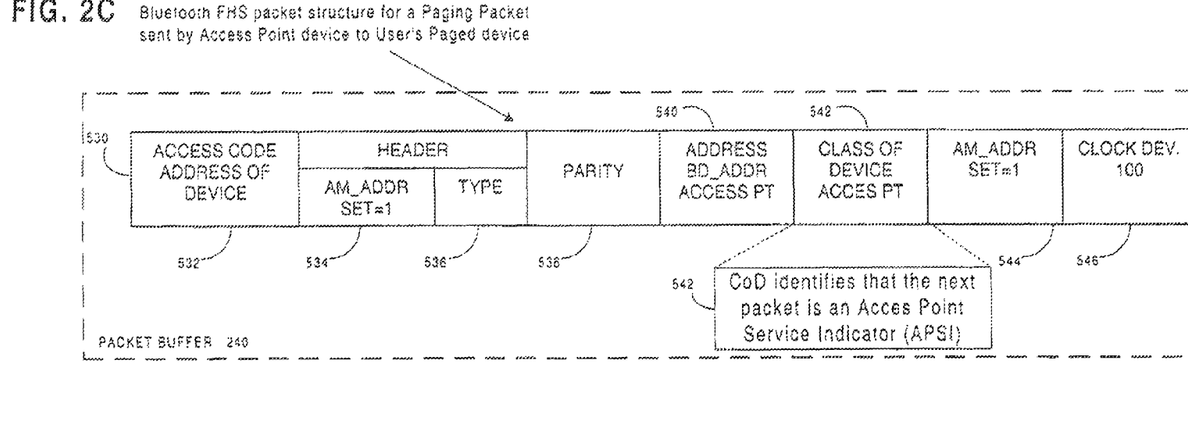
FIG. 2C is a representation of a Paging Packet sent by the Access Point to the mobile device in response to the FHS packet of FIG. 2B.

The Access point uses the information provided in the inquiry response packet 510 to prepare and send a paging message to the user's paged device or terminal. To establish a connection, the access point paging device must enter a page state. The access point invokes its link controller to enter the page state, where it will transmit paging message to the user's paged device using the access code and timing information acquired from the inquiry response packet 510. The user's paged device must be in the page scan state to allow the access point paging device to connect with it. Once in the page scan state, the user's paged device will acknowledge the paging message and the access point will send a paging packet 530, known as FIG. 2C. The paging packet includes the clock timing and access code of the access point paging device to the user's paged device. The paging packet 530 includes the class of device (CoD) field 542 that is a 24 bit field usually used to specify the class of the paging device, such as "mobile terminal". The COD field 542 includes a unique value indicating that the next packet to be received from the hotspot server paging device is a Access Point Service Indicator (APSI) message. Since the access point has initiated the page, it will be the main master device in a new PICO net formed by the terminal and the access point. The terminal or device page device, which will become the slave to the access point, must also know the access point BD_ADDR, since it is the master device address that is used in the PICO net being formed by the two devices. FIG. 2C shows the Bluetooth frequency hop synchronization (FHS) packet structure for a paging packet 530 sent by the access point includes an access code field 532, which contains the user's page device BD_ADDR. The FHS packet structure for the paging packets 530 sent by the BD_ADDR or MAC address includes; a header, which includes a slave member number field 534 in which AM_ADDR is now assigned a value of one (1), a type field 536 and a parity field 538. Another slave number field 544 also has AM_ADDR set to one (1). Field 542 contains the access point device class of device (CoD) unique value. in each code. The field 542 indicates the next packet sent to the terminal is at APSI message. If such indication is used, the device 104 (See FIG. 1) can be set to a mode where APSI messages are refused and if refusal is preferred, the user's device is automatically set to not reply with an APSI indication.

The FHS packet structure for the paging packet 530, provides the essential information about the access point that enables the user's paged to make the connection to the access point. Field 540 contains the access point BD_ADDR and field 546 contains the access point's current clock value.

Figure 2D:
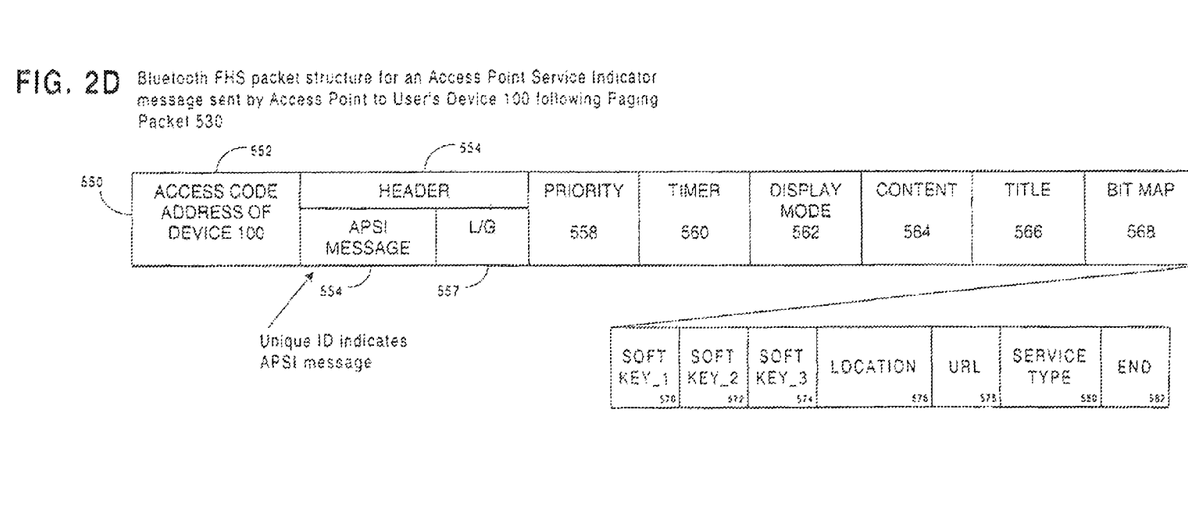
FIG. 2D is a representation of an Access Point Service Indicator message sent by the Access Point establishing a communication session with the mobile terminal.

FIG. 2D describes a Bluetooth packet structure for a subsequent APSI message 550. The APSI message includes a header 554, which contains the unique message ID 556 that indicates it is an APSI message. Also included in the APSI message 550, is priority information 558, timing information 560, display mode information 562, content 564, a title 556, a bit map, 568, soft key selection_1 information 570, soft key selection_2 information 572, location information 576, service type information 578, URL information 580, the handoff address 582 and an end marker 584. When the service is available outside the coverage area, the user's device may query whether a default bearer (e.g. may be activated in order to maintain the connection to the service.

Figure 3:
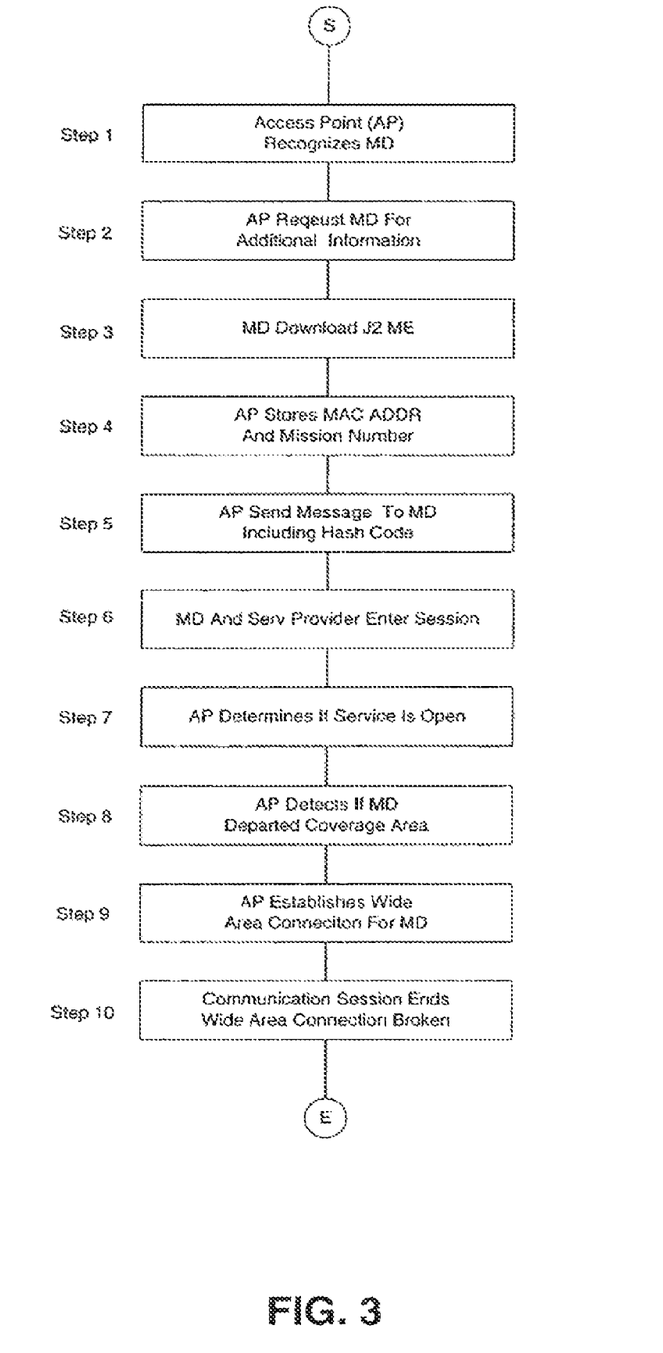
FIG. 3 is a flow diagram of a proximity registration and identification process for the terminal of FIG. 1 enabling the access point to maintain a communication session between the service provider and the mobile device when the mobile device leaves the coverage area of the access point.

FIG. 3 describes a process 300 for proximity registration and identification of a mobile device 104 with a hotspot access point 102, after discovery of the device by the access point, as follows:

Step 1: The access point, after recognizing the MAC address of the device, establishes a short-range communication link for initiating service with a service provider.

Step 2: The access point sends a message to the device requesting registration or a coupling of the MAC address and the device cellular address number (MSISDN).

Step 3: The device downloads an application J2ME stored in the terminal for proximity registration with the access point. After installing the application, the device registers with the access point. The J2ME application utilizes Bluetooth API (JSR82) and wireless messaging API (120) to send the hardware or MAC address and the machine number as the registration information to the access point.

Step 4: The access point stores the MAC address and associated cellular address number for the device.

Step 5: The access point sends a SMS message or MMS (email address) to the device providing (a) instruction on how to proceed in obtaining services from a service provider; (b) a hashed code of the MAC address or just a coupling of the MAC address and the machine number, as a wireless proximity identificator and (c) requesting the device forward the SMS or MMS (email address) message to the hotspot server for forwarding to the backend server. The wireless proximity identificator identifies the subscriber for hotspot based wireless services. The MAC address and cellular wireless number allow a service provider to communicate with the mobile device within the coverage area of an access point and outside the coverage area.

Step 6: The device establishes a communication session via the short-range communication link with the service provider linked to the Internet Step 7: The access point determines whether the service with the device through the short-range communication link is open.

Step 8: The access point detects the short-range communication link is closed by the device moving out of the coverage area of the access point.

Step 9: The access point establishes a wide area connection with the mobile device using the stored cellular address number and associated MAC address to maintain the on going session between the mobile device and the service provider.

Step 10: The communication session ends when the wide area connection is broken.

Hotspot access points can be programmed to provide tailored services and perform related billing for mobile terminals, including Internet connections, information processing, multi-media information, and the like while in the coverage area.

Figure 4:
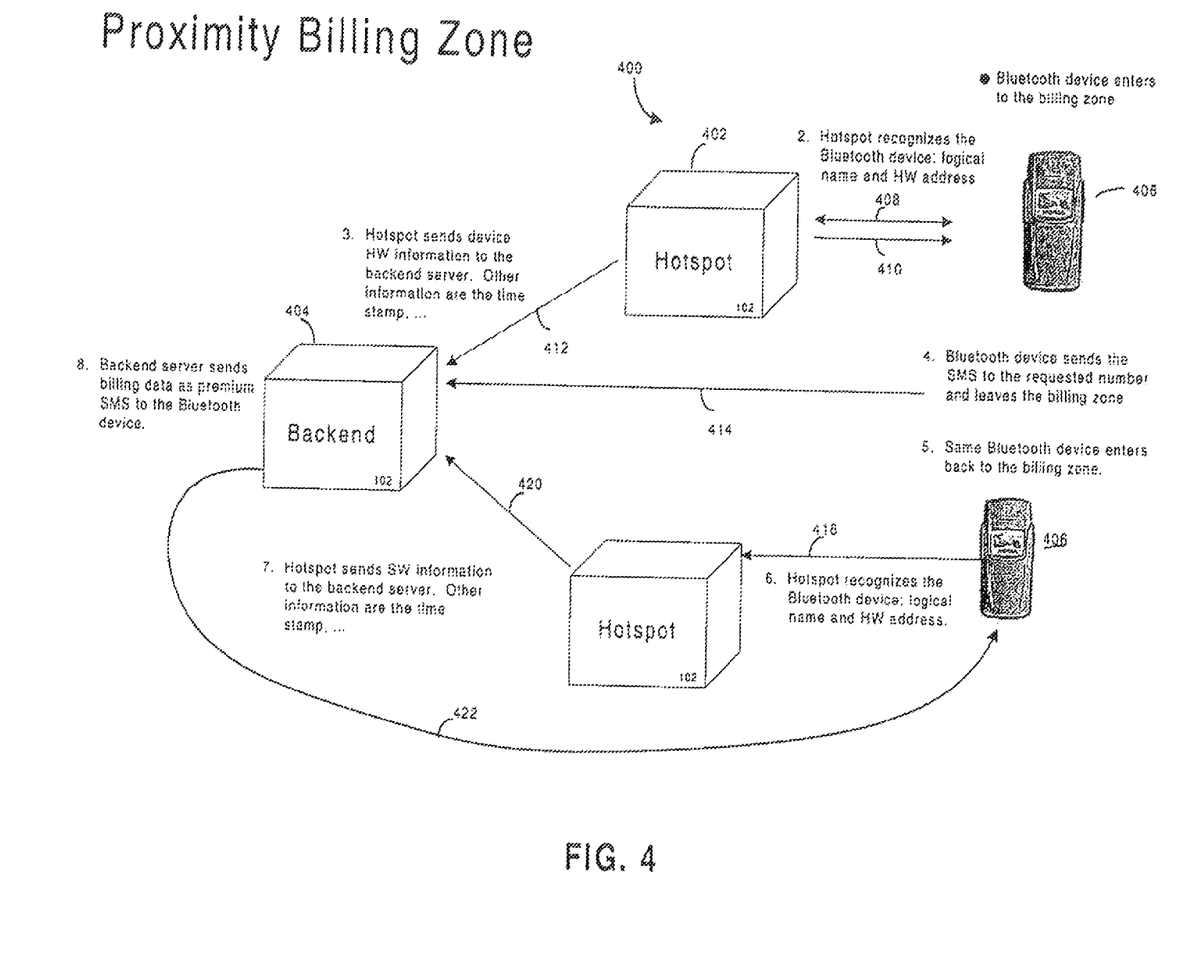
FIG. 4 is a flow diagram of one embodiment of a service available from a hotspot, e.g. billing costs for the mobile device of FIG. 1 for Internet services provided by the hotspot while the terminal is within the coverage area of the access point.

FIG. 4 discloses one implementation of the proximity registration and identification process 300 described in FIG. 3. A proximity billing zone process 400 enables a hot spot access point 402 including a backend server 404 to track and bill a mobile device 406 device for tailored services while in a billing zone (not shown) of the access point 402, as follows:

Step 1: The mobile device 406 utilizing Bluetooth protocols enters the hotspot access point billing zone using the service discovery protocol, as previously described.

Step 2: The access point and the mobile device exchange messages 408 and 410 and the access point recognizes the logical name and hardware address of the mobile device.

Step 3: The access point sends the device hardware address and other information including a time stamp in a message 412 to the backend server 404.

Step 4: The mobile device sends a message 414 to the backend server when departing the billing zone and the backend server records the time of departure.

Step 5: The mobile device re-enters the billing zone and utilizing SDP establishes a session with the access point.

Step 6: The access point sends a message 418 to the mobile device and recognizes the logical name and hardware address of the mobile device.

Step 7: The access point sends a message to the backend server including software information describing the mobile device and time of entry into the billing zone.

Step 8: The backend server calculates the billing time of the mobile device for the past entry into the billing zone and sends a message 422 to the mobile device providing the billing time for the past entry using short message service (SMS) whereupon the process ends.

Figure 5:
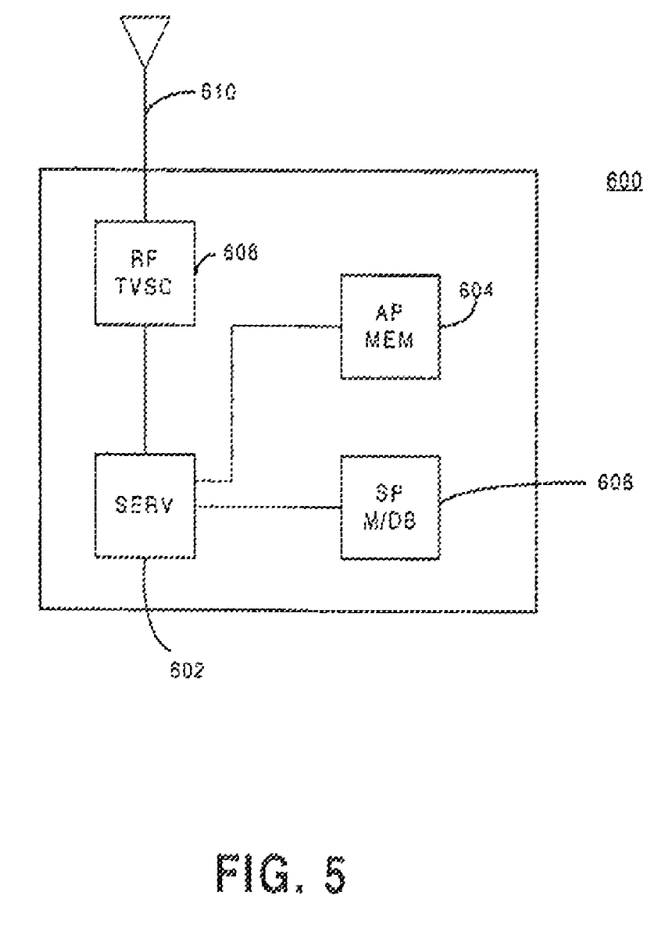
FIG. 5 is a representation of a hotspot access point integrated with a service provider for communicating with a mobile device in providing services within or outside the hotspot access point coverage area.

In another embodiment, shown in FIG. 5, a hotspot access point 600 includes a server 602, an access point programmed memory 604 and incorporates a service provider memory/database 606 programmed for providing tailored services to mobile devices via RF transceivers 608 and antenna 610. The access point establishes sessions with mobile terminals over short-range communication links (i.e. Bluetooth or IrDa, etc.) and wide area network connections (e.g. GSM transceiver) using the wireless proximity identificator, described in the process 300, which provides the short range address and the cellular address. In such case, the access point holds all the service information and if there is a need to contact a specific mobile device, the access point can decide whether to contact the device through a short-range communication link, e.g. Bluetooth when the device is within the coverage area of the access point or a cellular connection, e.g. GSM when the device is outside the coverage area of the access point. The cellular connection allows the service provider to continue a consumer relation with the mobile device while outside the coverage area in the mariner described, for example, in Ser. No. 10/053,044, entitled "Location Based Loyalty Mechanism", filed Jan. 15, 2002, assigned to the same assignee as that of the present invention and fully incorporated herein by reference. Moreover, many service provider services are not browser/J2ME based, but rely upon SMS/MMS messaging. Advantageously, GSM based mobile terminals provide SMS/MMS messaging, and do not require any additional functionality for hotspot based wireless services.

While the invention has been disclosed in terms of a preferred embodiment, various changes can be made without departing from the spirit and scope, as defined in the appended claims, in which:

We claim:

1. A system for providing short-range communication services for a mobile device that may enter and exit a coverage area and is configured to be communicatively coupled with a service provider, comprising:
    means for establishing communication with a network server of the service provider;
    means for identifying at least one code associated with the mobile device;
    means for establishing a short-range communication link with the mobile device within the coverage area;
    means for obtaining at least one wide area identification of the mobile device; and
    means for transmitting instructions to the mobile device that include a hashed code based upon the code associated with the mobile device and the wide area identification, and wherein the instructions are configured to:
        direct the mobile device to forward the hashed code to the system in a subsequent request for service from the network server, and
        after the mobile device leaves the coverage area, enable the system to associate a current session between the network server and the system with the subsequent request.

2. The system of claim 1, further comprising means for suggesting to the mobile device to initiate a wide area service session for services not available from the service provider.

3. The system of claim 1, wherein the means for establishing communication with a network server of the service provider comprises means for coupling the system to the service provider via an information network.

4. The system of claim 1, further comprising means for enabling the system to contact the mobile device and provide services via the short-range communication link if the mobile device is within the coverage area or through a cellular network if the mobile device is outside the coverage area.

5. The system of claim 1, wherein the at least one code comprises a hardware address associated with the mobile device.

6. The system of claim 1, wherein the at least one wide area identification comprises an identifier of the mobile device in wide area communications.

7. The system of claim 1, further comprising means for implementing cellular protocols on a wireless communication link with the network server.

8. The system of claim 1, further comprising means for receiving a first and a second identification of the mobile device.

9. The system of claim 1, further comprising means for generating a hashed code as a proximity identification of the mobile device.

10. The system of claim 1 wherein the short-range communication link implements Bluetooth-type protocols.

11. A system for providing short-range communication services for a mobile device that may enter and exit a coverage area and is configured to be communicatively coupled with a service provider, comprising:
    means for establishing a short-range communication link with an access point;
    means for transmitting a wide area identification to the access point;
    means for receiving instructions from the access point, wherein the instructions include at least one hashed code comprising a code associated with the mobile device and a wide area identification, and the instructions are configured to direct the mobile device to forward the hashed code to the access point in a subsequent request for service.

12. The system of claim 11, further comprising means for providing the access point with at least two identifications of the mobile device.

13. The system of claim 12, wherein at least one of the identifications is a MAC address.

14. The system of claim 13, wherein at least one of the identifications is a machine number for the mobile device.

15. The system of claim 12, wherein at least one of the identifications is a machine number for the mobile device.

16. The system of claim 11, wherein the short-range communication link implements Bluetooth-type protocols.

* * * * *